(12) United States Patent
Bassett et al.

(10) Patent No.: US 7,764,492 B2
(45) Date of Patent: Jul. 27, 2010

(54) SYSTEM THAT ACCOMMODATES NON-VOLATILE STORAGE DEVICES OF DIFFERENT SIZES

(75) Inventors: Jonathan D. Bassett, Fort Collins, CO (US); Ronald P. Dean, Fort Collins, CO (US); Tom J. Searby, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 716 days.

(21) Appl. No.: 11/669,265

(22) Filed: Jan. 31, 2007

(65) Prior Publication Data

US 2008/0180902 A1 Jul. 31, 2008

(51) Int. Cl.
 *G06F 1/16* (2006.01)
(52) U.S. Cl. .................. 361/679.33; 702/189; 711/129

(58) Field of Classification Search .................. 702/189; 711/100, 129, 167; 361/679.33, 679.34, 361/679.35, 679.36, 679.37, 679.38, 679.39
See application file for complete search history.

(56) References Cited

U.S. PATENT DOCUMENTS

| | | | | |
|---|---|---|---|---|
| 6,490,152 | B1 * | 12/2002 | White et al. | 361/679.32 |
| 7,177,782 | B2 * | 2/2007 | Falik et al. | 702/189 |
| 2005/0283343 | A1 * | 12/2005 | Cromer et al. | 702/189 |

* cited by examiner

*Primary Examiner*—Hung V Duong

(57) ABSTRACT

A system comprises a first mechanical adapter configured to accept a plurality of non-volatile storage devices of a first size. The system also comprises a cage into which the first mechanical adapter is installable. At least one non-volatile storage device of a second size is installable in the cage without the first mechanical adapter.

12 Claims, 3 Drawing Sheets

SYSTEM THAT ACCOMMODATES NON-VOLATILE STORAGE DEVICES OF DIFFERENT SIZES

BACKGROUND

Currently, most computers and workstations are designed for hard disk drives of a specific size (e.g., 3.5" drives). Smaller, newer drives, such as 2.5" drives, are now available. Systems designed for one size drive unfortunately do not accept drives of a different size.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
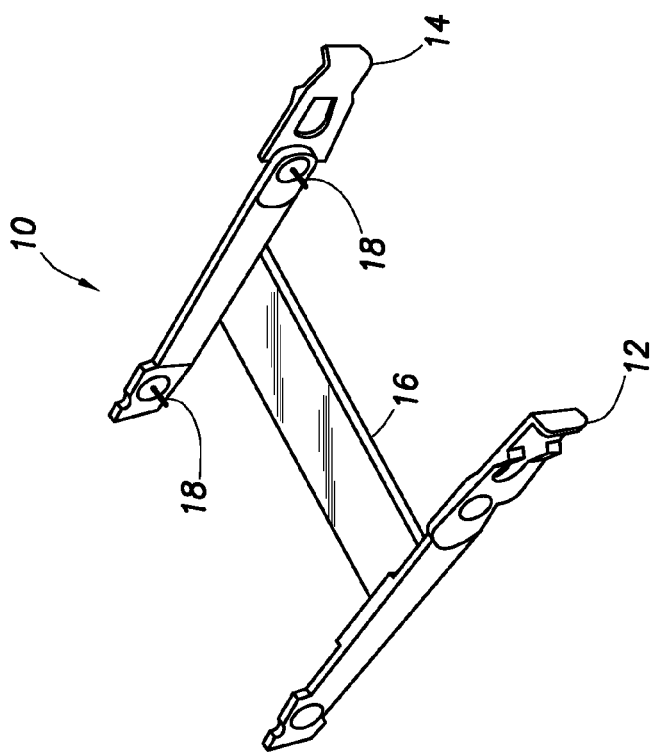
FIG. 1 shows an adapter for use with a non-volatile storage device of a particular size in accordance with various embodiments.

FIG. 1 illustrates a mechanical adapter 10 in accordance with various embodiments. Adapter 10 is configured to accept a non-volatile storage device of a particular size. In the illustrative embodiment of FIG. 1, the adapter 10 comprises a plurality of side rails 12 and 14 connected by way of a center brace 16. Four retaining pins 18 (two pins 19 are viewable in FIG. 1) are provided on the inner surfaces of the side rails 12, 14. In other embodiments, the number of retaining pins can be different than 4. The retaining pins 18 insert into corresponding recesses in sides of the non-volatile storage device to retain the storage device in place on the adapter 10.

Figure 2:
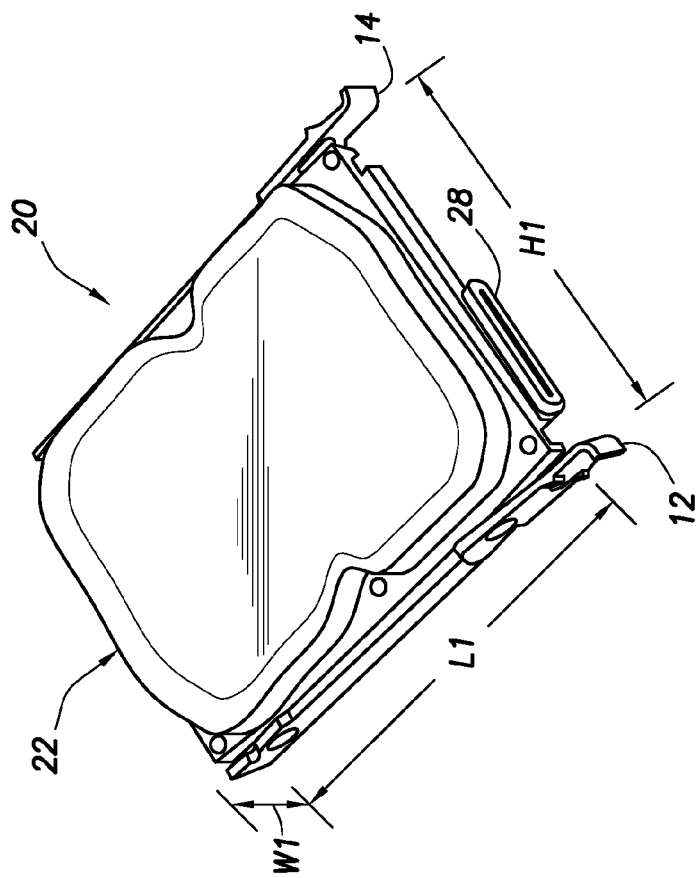
FIG. 2 shows the adapter of FIG. 1 into which a non-volatile storage device has been installed in accordance with various embodiments.

FIG. 2 illustrates the adapter 10 of FIG. 1 with a non-volatile storage device 22 mated thereto to form a storage device assembly 20. In at least some embodiments, the adapter 10 is configured to accept only a single non-volatile storage device 22, while in other embodiments, more than one storage device can be installed onto adapter 10. In the embodiment depicted in FIG. 2, the non-volatile storage device 22 comprises a hard disk drive, but other forms of non-volatile storage are acceptable as well. The non-volatile storage device 22 is, in some embodiments, a 3.5" hard disk drive. The 3.5" dimension defines the diameter of the magnetic storage medium contained within the storage device. The diameter of the storage medium, in turn, defines the overall length (L1), width (W1) and height (H1) of the storage device 22. In at least one embodiment, L1, W1 and H1 are approximately 6", 1", and 4", respectively. References to storage device "size" in this disclosure refers to either or both of storage medium diameter as well as the device's outer dimensions. One or more power and/or data electrical connectors 28 are provided on an outer surface of the storage device 22.

Figure 3:
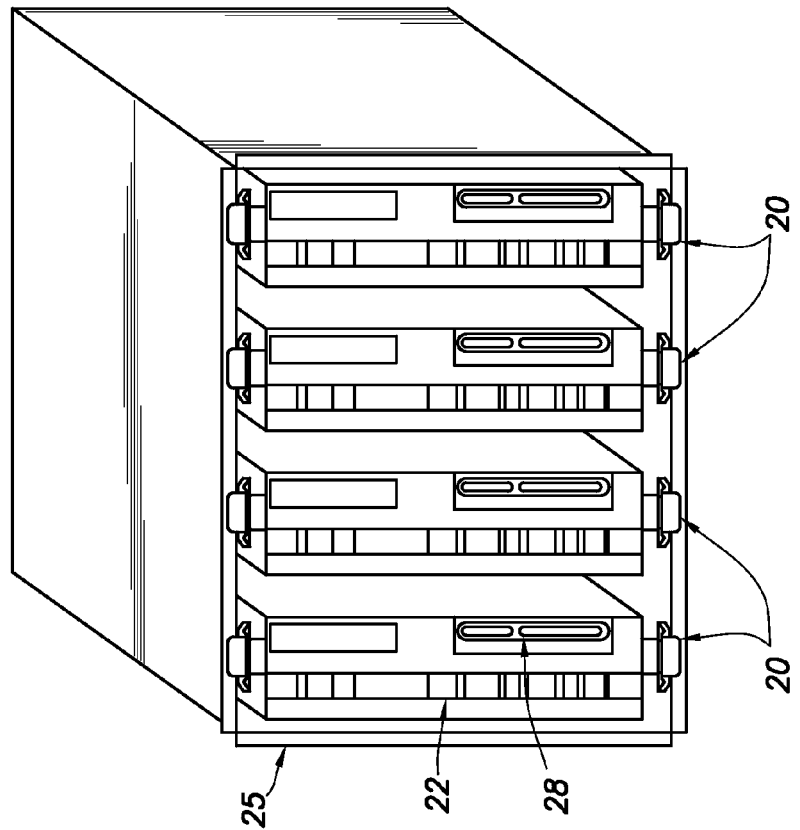
FIG. 3 illustrates a cage for a computer system into which a plurality of the adapters of FIG. 2 have been installed in accordance with various embodiments.

FIG. 3 illustrates a portion of a computer or other type of system configured to accept non-volatile storage devices such as device 22. The system comprises a "cage" 25 into which one more of the storage device assemblies 20 are installed. The cage 25 is made from, for example, metal or other suitable material. In some embodiments, each of the storage device assemblies 20 slide into the cage 25. Side rails 12 and 14 engage corresponding surfaces in the cage. In the illustrative embodiment of FIG. 3, cage 25 can accommodate four storage device assemblies 20. The relative size of the cage 25 and size of the storage device assemblies 20 dictate the number of storage device assemblies 20 that can be installed in cage 25.

Figure 4:
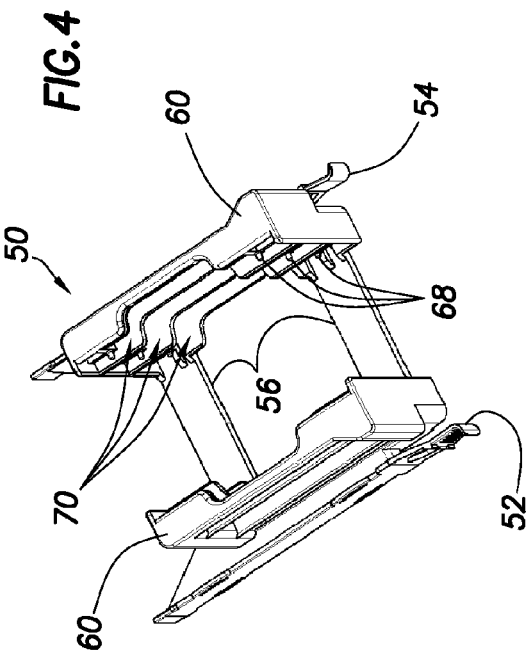
FIG. 4 shows another adapter for use with non-volatile storage devices of a different size in accordance with various embodiments.
Figure 5:
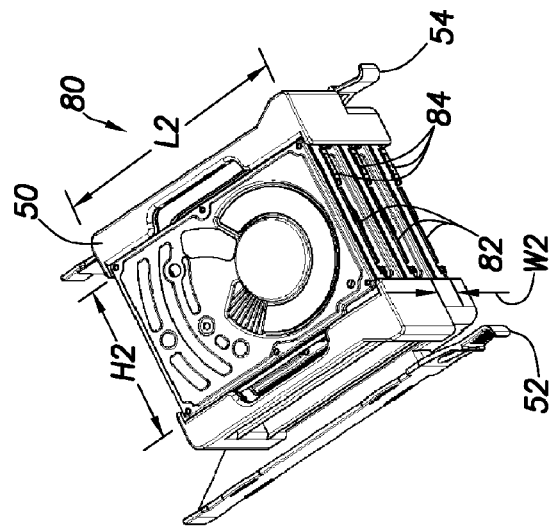
FIG. 5 illustrates the adapter of FIG. 4 into which multiple non-volatile storage devices have been installed in accordance with various embodiments.

FIGS. 4 and 5 illustrate another mechanical adapter 50 that is configured to accept one or more non-volatile storage devices. The adapter comprises a pair of side rails 52 and 54 much like the side rails 12 and 14 of the adapter 10 in terms of dimensions. In some embodiments, the dimensions of the side rails 52 and 54 of adapter 50 are substantially equal to the dimensions of the side rails 12, 14 of adapter 10.

The adapter 50 also comprises a pair of opposing side members 60. Each side member contains a cavity 70 into which an edge of a non-volatile storage device is received. The side members 60 are pulled apart to a sufficient degree to enable non-volatile storage devices to be installed in the adapter. Each side members also comprises one more retaining pins 68 which function in much the same way as retaining pins 18 described above with regard to adapter 10.

FIG. 5 illustrates the mechanical adapter 50 with multiple non-volatile storage devices 82 mated thereto to form a storage device assembly 80. Each non-volatile storage device has one or more power/data connectors 84.

In at least some embodiments, the storage devices 82 that are installed into adapter 50 have a size that is different from the storage devices 22 that are installable into adapter 20. For example, adapter 50 accepts 2.5" non-volatile storage devices, while adapter 10 accepts 3.5" non-volatile storage devices. The diameter of the storage medium contained in a 2.5" storage device is approximately 2.5". The outer length (L2), width (W2) and height (H2) dimensions of the non-volatile storage devices 82 usable with adapter 50 are different than the corresponding L1, W1, and H1 dimensions of the non-volatile storage devices 22 usable with adapter 10. In at least one embodiment, L2, W2 and H2 are approximately 4", ½", and 2¾", respectively.

Figure 6:
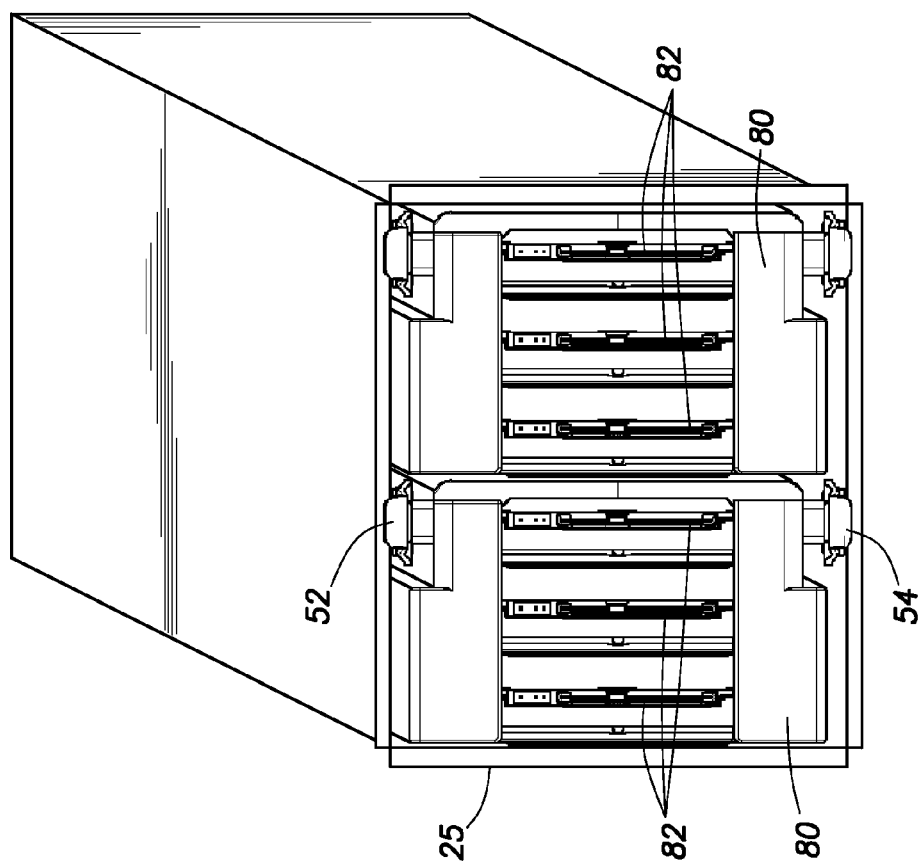
FIG. 6 illustrates the cage of FIG. 3 into which multiple adapters of FIG. 5 have been installed in accordance with various embodiments.

Because non-volatile storage devices 82 are smaller than non-volatile storage devices 22, in at least some embodiments, the cage 25 can accommodate more non-volatile storage devices 82 than non-volatile storage devices 22. FIG. 6 illustrates an embodiment in which two storage device assemblies 80 are installed in the same cage 25 that was illustrated in FIG. 3. The storage device assemblies 80 slidingly engage into the cage 25 using side rails 52, 54. The side rails 52, 54 enable each storage device assembly 80 to attach to the cage in much the same way as slide rails 12, 14 of adapter 10.

In FIG. 3, four storage device assemblies 20, and thus four non-volatile storage devices 22, are installed in the cage 25. In FIG. 6, however, two storage device assemblies 80, and thus six non-volatile devices 82, are installed in the cage. Thus, in these embodiments, the cage can accommodate four larger non-volatile storage devices 22 or six smaller non-volatile storage devices 82. The adapter 50 enables the smaller non-volatile storage devices 82 to be installed in a cage that also accommodates larger non-volatile storage devices.

Figure 7:
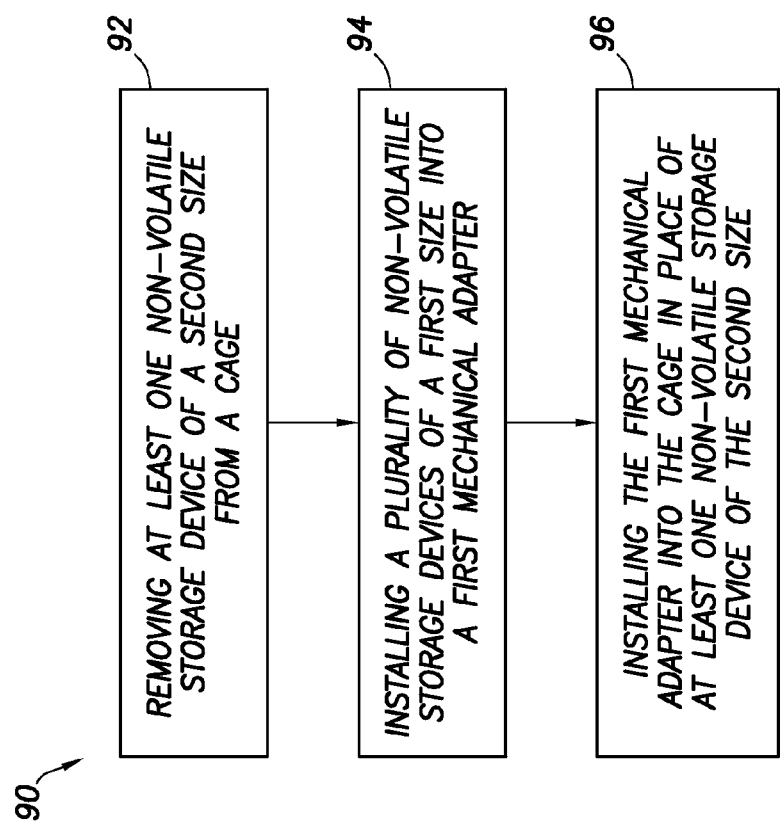
FIG. 7 illustrates a method in accordance with various embodiments.

FIG. 7 illustrates a method 90 in which larger non-volatile storage devices 22 are swapped with smaller non-volatile storage devices 82. At 92, the method 90 comprises removing at least one non-volatile storage device of a second size (e.g., the larger size of non-volatile storage devices 22) from a storage device cage (e.g., cage 25). This action comprises, for example, removing all of the storage drive assemblies 20 containing the larger non-volatile storage devices 22. At 94, the method 90 comprises installing a plurality of non-volatile storage devices of a first size (e.g., the smaller size of the non-volatile storage devices 82) into a first mechanical adapter (e.g., adapter 50). At 96, the method 96 further comprises installing the first mechanical adapter into the cage in place of the non-volatile storage device(s) removed at 92.

A computer system that can accommodate non-volatile storage devices 22, 82 of different sizes enables more non-volatile storage devices of a smaller size to be installed. With more, yet smaller, non-volatile storage devices, the system can access more non-volatile storage devices (for reads and/or writes) in parallel thereby resulting in a performance increase for the system. Furthers still, such as system provides increased flexibility for a user who may desire to change an existing set of non-volatile storage devices for storage devices of a different size.

The above discussion is meant to be illustrative of the principles and various embodiments of the present invention. Numerous variations and modifications will become apparent to those skilled in the art once the above disclosure is fully appreciated. For example, the number of either type of storage device 22, 82 installable into cage 25 can be varied depending on customer preferences, overall size of the computer into which the cage is provided, etc. It is intended that the following claims be interpreted to embrace all such variations and modifications.

What is claimed is:

1. A system, comprising:
   a first mechanical adapter configured to accept a plurality of non-volatile storage devices of a first size;
   a cage into which said first mechanical adapter is installable;
   wherein at least one non-volatile storage device of a second size is installable in said cage without said first mechanical adapter.

2. The system of claim 1 further comprising a second mechanical adapter configured to accept said at least one non-volatile device of the second size.

3. The system of claim 2 wherein the first and second mechanical adapters have a plurality of side rails usable to install the first and second mechanical adapters into said cage.

4. The system of claim 3 wherein each of the first and second mechanical adapters comprises two side rails spaced apart from one another by a common distance.

5. The system of claim 1 further comprising a second mechanical adapter configured to accept only one non-volatile device of the second size.

6. The system of claim 5 wherein the cage accommodates a plurality of said second mechanical adapters, each of said second mechanical adapters configured to accept only one non-volatile device of the second size.

7. The system of claim 1 wherein said first mechanical adapter accommodates a first number of said non-volatile storage devices of the first size and the cage accommodates a second number of non-volatile storage devices of the first size, said first and second numbers being different.

8. The system of claim 1 wherein the cage accommodates a plurality of said first mechanical adapters, each of said first mechanical adapters configured to accept a plurality of non-volatile storage devices of the first size.

9. The system of claim 1 wherein the first mechanical adapter is configured to accept a plurality of non-volatile storage devices of the first size in a stacked arrangement.

10. The system of claim 1 wherein the non-volatile storage devices comprise hard disk drives.

11. A method, comprising:
   removing at least one non-volatile storage device of a second size from a cage;
   installing a plurality of non-volatile storage devices of a first size into a first mechanical adapter; and
   installing said first mechanical adapter into said cage in place of said at least one non-volatile storage device of the second size.

12. The method of claim 11 wherein installing the plurality of non-volatile storage devices of the first size into a first mechanical adapter comprises installing the plurality of non-volatile storage devices of the first size in a stacked arrangement.

* * * * *